TELEVISION RECEIVER WITH BUILT-IN COLOR BAR TEST PATTERN

Filed Dec. 13, 1955

Inventors
Joseph E. Davis and
John K. Allen
by Mason, Kolehmainen, Rathburn and Wyss.
Attorneys.

United States Patent Office 2,931,856
Patented Apr. 5, 1960

2,931,856

TELEVISION RECEIVER WITH BUILT-IN COLOR BAR TEST PATTERN

Joseph E. Davis and John K. Allen, Buffalo, N.Y., assignors, by mesne assignments, to Sylvania Electric Products Inc., Wilmington, Del., a corporation of Delaware Application December 13, 1955, Serial No. 552,834

3 Claims. (Cl. 178—5.4)

The present invention relates to television receivers, more particularly to such television receivers as are adapted to produce an image in simulation of its natural color in response to a received signal, and the invention has for an object the provision of a new and improved color reference source which may be readily and economically incorporated into a competitive type color television receiver so as to facilitate rapid and accurate adjustment thereof.

In order to adjust a color television receiver so that the image reproduced on the screen thereof corresponds to the transmitted image, a test pattern consisting of a plurality of contiguously arranged vertical bars of standard colors is transmitted, usually before transmission of the color program is initiated. The present-day color bar test pattern consists of seven vertical bars, the colors of which are respectively, white, yellow, cyan, green, magenta, red and blue. To adjust the various controls of the color television receiver properly to reproduce this pattern of vertical color bars, it is necessary to be able to recognize the hue and saturation of the various colors which make up the pattern. It has been discovered, however, that the average person who owns and operates a color television receiver is unable accurately to remember and recognize these characteristics of the color bars in the standard pattern.

In some of the better television receivers which are now commercially available on the market, a border of white light generally known as surround light is provided for the face of the picture tube. Consequently, since a source of light is available at the front of television receivers which utilize surround lighting, it would be desirable to incorporate at the front of such receivers a color reference source which is illuminated by the source of light that illuminates the border of the picture, and another object of the present invention is, therefore, to provide an improved color reference source for a color television receiver of the type utilizing surround lighting such that the source of illumination for the surround lighting is also employed for illuminating the color reference source.

A further object of the present invention is to provide a new and improved color reference source for facilitating the adjustment of the controls of a color television receiver and which produces a plurality of high quality reference colors without substantially increasing the manufacturing cost of the receiver.

Briefly, in accordance with the present invention, the above and other objects are realized by providing a composite light filter which is movable from a position out of view to a position directly in front of a portion of the surround light and preferably in juxtaposition with a horizontal edge of the face of the picture tube so that when a color test bar pattern is transmitted, the color reference source, which ordinarily is not visible, may be moved into an operative position wherein color reference bars thereon are contiguous with the corresponding bars appearing on the face of the picture tube.

The invention, both as to its organization and method of operation, together with further objects and advantages thereof, will best be understood by reference to the following detailed description taken in connection with the accompanying drawing, in which.

Figures 1, 2, 3, 4, 5:
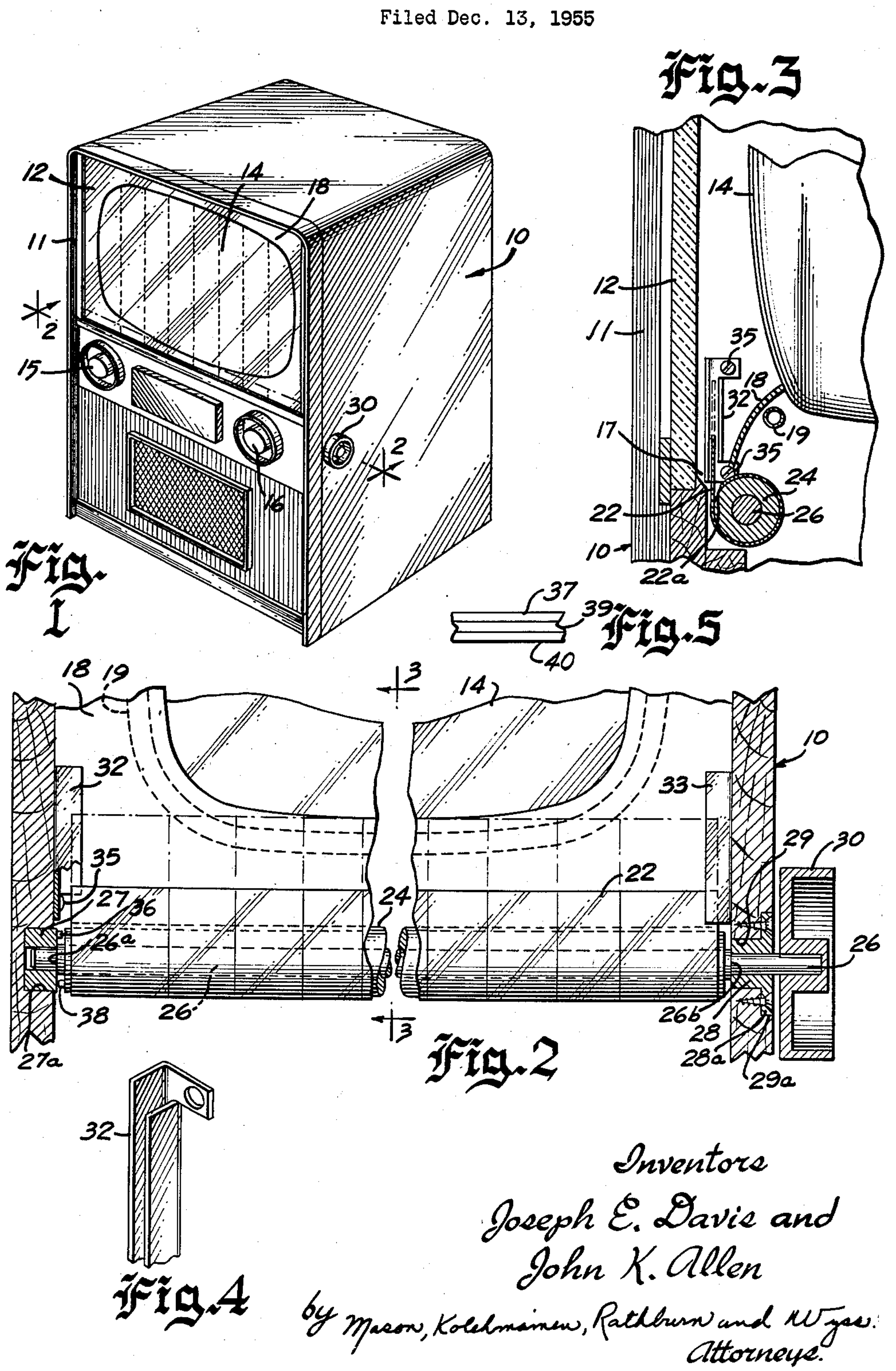
Fig. 1 is a perspective view of a color television receiver in which the color reference source of the present invention is embodied.
Fig. 2 is a fragmentary sectional view of the television receiver of Fig. 1 taken along the line 2—2 thereof.
Fig. 3 is a fragmentary sectional view of the apparatus of Fig. 2 taken along the line 3—3 thereof assuming all of the apparatus to be shown in Fig. 2.
Fig. 4 is an enlarged fragmentary isometric view of a guide track shown in Figs. 2 and 3.
Fig. 5 is a fragmentary cross-sectional view of a filter suitable for use in the illustrated embodiment of the invention.

Referring now to the drawing, and particularly to Fig. 1 thereof, there is shown a color television receiver including a cabinet 10 which has at the front thereof an aperture 11 covered by a windowpane 12 preferably constructed of a strong transparent material such as, for example, safety glass, and through which is viewed a reproduced television image appearing on the face or screen of a color television picture tube 14. A pair of conventional dual control knobs 15 and 16 for adjusting various circuit elements of the receiver are disposed in the front wall of the cabinet 10 beneath the window 12. An apertured masking member 18, which is preferably translucent, in conjunctin with a source of light 19, shown best in Figs. 2 and 3, effects an illuminated border for the reproduced image. The source of light 19 is conveniently a substantially annular gaseous discharge tube which in itself may produce white light or which in conjunction with the masking member 18 may produce a white illuminated border for the picture. Although it is understood that the border of light may be provided in a number of other ways and that the color of the border need not be white, the present invention is described in connection with surround lighting apparatus in which a distributed light source in the form of a gaseous tube is positioned behind a translucent masking filter so that substantially white light is emitted from the mask.

Both the mask 18 and the light source 19 are mounted on the cabinet 10 preferably from the top and sides thereof so that a horizontal slot 17 is provided between the bottom edge of the mask 18 and the front wall of the cabinet 10 slightly above the lower edge of the windowpane 12. As shown, a light filter 22 in the form of a thin flexible sheet having a width but slightly less than the aperture 11, is attached by suitable means such as by bonding or stapling along one edge 22_a_ thereof to a cylindrical roller 24. So as to permit facile movement of the filter 22 into and out of operative position in front of the mask 18, the roller 24 is suitably keyed on a shaft 26 which is journaled near its respective ends in bearing members 27 and 28 provided in the opposite side walls of the cabinet 10 directly beneath the bottom portion of the mask 18. The shaft 26 extends outwardly from one side of the cabinet 10 through the bearing 28 and for convenience of adjustment, a knob 30 is keyed to the shaft 26.

Specifically, the bearing 27 is mounted in a recess 27_a_ in one inner side wall of the cabinet 10 and the bearing 28 is mounted in an aperture 29 in the opposite side wall. The bearing 28 has an annular flange 28_a_ at one end thereof for coaction with the rabbet 29_a_ to prevent inward movement of the bearing with respect to the cabinet 10. Also, the shaft 26 is provided with ends of reduced size so as to provide respective shoulders 26_a_ and 26b which abut against the inwardly directed ends of the bearings 27 and 28 to prevent lateral movement of the shaft 26 and the roller 24 which is keyed to it.

It is desirable that the filter 22 be substantially planar when it is disposed in an operative position before the mask 18, and to this end, a pair of channeled guide tracks 32 and 33 are secured by suitable screws 35 in vertical positions against the opposite side walls of the cabinet 10 such that the common plane of the guide tracks is substantially tangential with the forward edge of the roller 24 and passes through the slot 17. Thusly, clockwise rotation of the knob 30 causes the filter 22 to move upwards through the slot 17 in a vertical path determined by the guide tracks 32 and 33 between the window 12 and the mask 18.

Excessive rotation of the roller 24 which would cause severance of the filter 22 therefrom is prevented by means of a stop arrangement comprising opposing detents 36 and 38 respectively provided on the opposing ends of the roller 24 and the bearing 27. Preferably, the filter 22 is constructed of a pair of flexible transparent sheets 37 and 40 between which are sandwiched suitable gelatin filters 39 of rectangular shape. If desired, however, the filter 22 may be constructed of a very flexible material such that it is not itself self-supporting; in which case, edge supporting members constructed of a material such as, for example, steel tape, not shown, are secured to the edges of the filter 22 and received in the guide channels 32 and 33.

When the filter 22 is moved to its operative position, it is illuminated by the light emanating from the mask 18 and provides at the front of the receiver a reference source of the exact colors which should appear on the screen of a properly adjusted color television receiver during reception of the test bar pattern. As best shown in Fig. 1, the filter 22 comprises seven adjacent and contiguous rectangular sections having respective light transmission characteristics such that when the filter is illuminated from the source 19 and the mask 18, the color of each section of the filter 22 corresponds to the desired color of the associated bar on the screen of the picture tube 14. Because the widths of the sections of the filter 22 are equal to the widths of the bars of the reproduced test bar pattern, the reference colors appear to be adjacent and below the televised bars, and when the various controls of the receiver are properly adjusted, the reference bars appear as mere continuations of the reproduced test pattern. Consequently, highly accurate adjustment of the receiver controls may be effected.

After the necessary adjustment of the color television receiver has been made, the knob 30 is rotated counter-clockwise thereby to move the filter sheet 22 out of view so that the front of the color television receiver 10 is completely devoid of any reference colors, and the normal border of surround light is provided.

By utilizing the light emanating from the mask 18 to illuminate the filter 22, a number of important advantages are effected, not the least of which are the utilization of a common source of light for energizing the color source and for illuminating the border of the picture and the provision, in an economical manner, of reference colors having uniformity of hue and saturation throughout their entire visible area.

Although it is not necessary for the mask 18 and source 19 to emit white light, it is preferable to provide a source of substantially white light for illuminating the filter 22 so that standard filter elements may be used. If other than white light is utilized for this purpose, the filter sections of the filter 22 are selected such that the colors of the reference source are, nevertheless, true in both hue and saturation. Of course, the source of light 19 must emit those bands of frequencies which make up the reference colors.

In order to maintain the saturation of the color reference source constant, it is desirable that the intensity of the light from the source 19 be maintained constant irrespective of variations in the voltage from the power line energizing the receiver. For this reason, the source 19 is generally energized from the power line through a voltage regulator which, in addition to maintaining the intensity of illumination of the border constant, insures that the color reference is accurate, thus avoiding poor adjustment of the receiver.

In accordance with a further aspect of the present invention, the characteristics of the source 19 and the mask 18 are selected so as to provide a border of surround light which corresponds to the desired color of the picture when white light is transmitted. Standard white light for purposes of television is known as "illuminant C" and is the color of bar steel at a temperature within the range of 6200 to 6400 degrees Kelvin. Surround lighting as presently used has a lesser blue component than this being of the order of 7200 degrees Kelvin, and consequently, a different mask 18 or light source 19 or both must be provided to produce illuminant C light. By providing a surround light having the color of illuminant C, an inexpensive color reference for white light is provided. For purposes of economy, the other reference colors need not be provided, but where high quality reproduction is desired, it is important to provide a good reference for each of the colors in the standard color bar test pattern.

While the invention has been described in connection with a particular embodiment of the invention, it will be understood that various modifications may be made thereon which are within the true spirit and scope of the invention as defined in the appended claims.

What is claimed as new and desired to be secured by Letters Patent of the United States is:

1. In a color television receiver in which an image is reproduced on a viewing screen thereof, the combination of a translucent masking member adjacent to and surrounding said screen to provide a visible border therefor, light producing means disposed within said receiver in proximity to said masking member to illuminate said masking member, a light filter mounted on said receiver adjacent a horizontal edge of said screen, said filter comprising a plurality of contiguous elements which each pass light in a frequency range different from that passed by the other filter elements, said elements coinciding in position with the bars in a receivable color bar test pattern, and means for moving said filter in position to be illuminated by light from said light producing means and for selectively moving said filter to a position within said receiver that is out of view.

2. In combination, in a television receiver, a cabinet, a viewing screen mounted within the cabinet, a translucent masking member surrounding said screen to provide a visible border therefor, means within the cabinet to illuminate said translucent masking member, a transparent protective panel mounted upon said receiver in front of and spaced from said screen, a light filter mounted out of view within said cabinet, and means to move said light filter into view along the bottom edge of said screen in the space between said transparent protective panel and said masking member.

3. Television receiving apparatus comprising a cabinet having a front wall; a cathode ray tube mounted within the cabinet and having its viewing screen visible through an opening in said front wall; a translucent masking member around the periphery of the viewing screen of said tube, said masking member also lying between said front wall and said viewing screen and also being viewable through the opening in said front wall, said mask being mounted within said cabinet so as to provide a horizontal slot between the bottom edge of the mask and the inner lower edge of the opening in the front wall of said cabinet; means behind the masking member to illuminate the same and cause it to emit white light thereby producing a white luminous border around said tube screen; a light filter having a width less than the width of said slot, mounted out of direct view behind the front wall of said cabinet, said filter having a plurality of bar sections transmitting different colors of a predetermined test pattern; and means for moving said filter through said slot directly in front of the lower portion of said surrounding, translucent masking member and in juxtaposition with the lower horizontal edge of the screen of said cathode ray picture tube so that when a test, color bar pattern is produced on said screen, the color reference bar sections of said light filter are contiguous to corresponding color bars on the screen of the tube and appear as a continuation of the test bar pattern produced on said screen.

References Cited in the file of this patent

UNITED STATES PATENTS

| | | |
|---|---|---|
| 2,665,419 | Orden | Jan. 5, 1954 |
| 2,668,188 | Naslund | Feb. 2, 1954 |
| 2,779,938 | Pifer | Jan. 29, 1957 |
| 2,854,505 | Davis | Sept. 30, 1958 |

OTHER REFERENCES

Bedford: Abstract of Ser. No. 83,652, March 26, 1949.